Patented Oct. 24, 1944

2,361,327

UNITED STATES PATENT OFFICE 2,361,327

ARYLOXY-ALKACYL-ARYLENES

Chiles E. Sparks, Wilmington, Del., assignor to E. I. du Pont de Nemours & Company, Wilmington, Del., a corporation of Delaware No Drawing. Application July 12, 1940,
Serial No. 345,172

1 Claim. (Cl. 260—559)

This invention relates to new intermediates for azo dyes; and more particularly to mono- and di-(amino-aryloxy-acyl)-diamino arylenes of the benzene, naphthalene and biphenyl series, and to the corresponding di-(nitro-aryloxy-acyl)-diamino arylenes from which these compounds are derived by reducing the nitro groups.

It is among the objects of the invention to provide a class of dinitro and diamino diaryl compounds having a bridging group comprising an oxy-alkacylamino group. Another group of the invention is to provide such compounds in which the bridge between the aryl radicals consists of two such bridging groups connected by an aryl radical. Another object of the invention is to provide new organic compounds which are useful as components for making derivatives, such as azo dyes. Still another object of the invention is to provide new biphenyl diamines which are especially useful as diazo components for making azo dyes. Other objects of the invention will be apparent from the following description.

The objects of the invention are attained in general by condensing nitro acid halides of the type represented by the formula

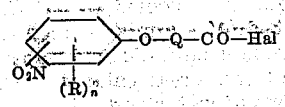

with aromatic diamines or nitro aromatic monoamines of the benzene, naphthalene and biphenyl series which are represented by the formulae

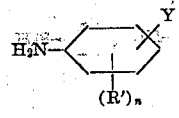

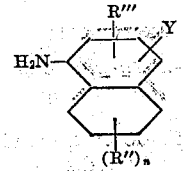

and

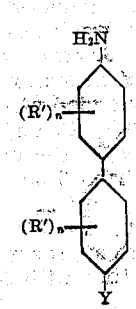

In the above formulae, Q represents the radical of a straight or branched chain aliphatic hydrocarbon having 1 to 6 carbon atoms; R is from a group consisting of hydrogen, halogen, lower alkyl, and lower alkoxy; $n$ is 1 to 2; Y is nitro or amino; R' is from a group consisting of R, carboxy, sulfonic acid and lower carboxy-alkoxy; R'' is from a group consisting of hydrogen, halogen, carboxy and sulfonic acid; and R''' is one of a group consisting of hydrogen, lower alkyl, and lower alkoxy. The term "lower," in connection with alkyl or alkoxy, refers to alkyl groups having 1 to 6 carbons. Some of these compounds can be made by condensing a nitro-phenoxy-aliphatic acid corresponding to the above described nitro acid halides with any of the described aromatic amines or diamines in the presence of phosphorus trichloride, except the carboxy and sulfonic acid derivatives of the nitro amines or diamines of the benzene, naphthalene and biphenyl series. The diamino products are made by reducing the nitro groups of the end nitro phenyl radicals.

More particularly, products represented by the following general formulae are produced:

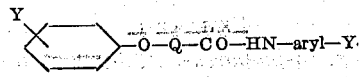

and

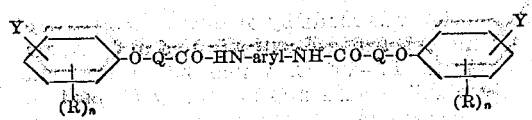

The invention will be more fully set forth in the following more detailed description which includes examples that are given as illustrations thereof. Parts are expressed in parts by weight unless otherwise specified, due allowance being made for adventitious constituents of the compounds specified.

EXAMPLE I

*1-(4'-nitro-phenoxy-acetylamino)-3-nitro-benzene*

A mixture was made by adding 69 parts of 4-nitro-phenoxy-acetic acid and 48.3 parts of 3-nitro-1-amino-benzene to approximately 298 parts of toluene. The mixture was agitated and 58 parts of toluene were distilled off. The residue was cooled to 30° C. and 24.1 parts of phosphorus trichloride were slowly added so that the temperature was not raised above 50° C. After all the phosphorous trichloride had been added, the charge was slowly heated to 111°–114° C. in a container equipped with a reflux condenser. This required from 1 to 1½ hours. The charge was maintained at reflux temperature (112°–114° C.) for 3½ hours longer and then cooled to 25° C.

The cooled charge was diluted with 117 parts of water and while keeping the temperature below 25° C., sodium hydroxide was then slowly added until the charge was faintly alkaline to phenolphthalein papers. The mixture was stirred 10 minutes and filtered. The filter cake was washed well and dried at 60°–65° C. The 1-(4'-nitro-phenoxy-acetylamino)-3-nitro-benzene thus produced was 98.5% pure as determined by its TiCl₃ value and it melted at 177°–180° C.

3-(4'-amino-phenoxy-acetylamino)-1-amino-benzene

A mixture consisting of 137 parts of 1-(4'-nitro-phenoxy-acetylamino)-3-nitro-benzene, 13.7 parts of reduced nickel catalyst and 218 parts of anhydrous methanol was charged into an autoclave and the air was flushed out with hydrogen. The autoclave was closed and the charge was heated to 90°–100° C. and stirred under 500 lbs./sq. in. hydrogen pressure until no more hydrogen was absorbed. The charge was kept in the autoclave at 90°–100° C. under 500 lbs./sq. in. hydrogen pressure for ½ hour longer, then cooled to 30°–35° C. and filtered. The filtrate was slowly added to 1335 parts of cold water which had been made slightly alkaline to phenolphthalein paper whilst keeping the mixture below 20° C. This mixture was stirred 15 minutes and filtered. The press cake was thoroughly washed and dried in an air dryer at 30° C. The melting point of the product was 93°–95° C. and its purity, as determined by nitrate value, was 87.7%. The product is represented by the formula

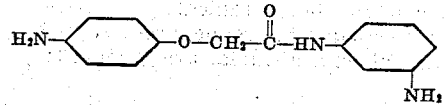

Example II
1,3-di(4'-nitro-phenoxy-acetylamino) benzene-4-sulfonic acid

A solution was made by dissolving 188 parts of 1,3-diamino-benzene-4-sulfonic acid in 2000 parts of water at 10°–20° C. which had been made faintly alkaline with approximately 55 parts of sodium carbonate. Another solution was made by dissolving 540 parts of 4-nitro phenoxy-acetyl-chloride in approximately 2000 parts of 1,2-dichloroethane. Enough of the latter solution was slowly added to the first solution over a period of 1 to 2 hours to provide nearly enough 4-nitrophenoxy-acetyl chloride to combine with the 1,3-diamino-benzene sulfonic acid. During this time, good agitation and a temperature of 10°–20° C. were maintained and sodium carbonate was slowly added when needed to keep the mixture faintly alkaline to phenol-phthalein paper. The mixture was agitated at 10°–20° C. for 3 hours longer. Small portions of the solution of 4-nitro-phenoxy-acetyl chloride were then added with subsequent stirring and the same conditions of temperature and alkalinity until the mixture contained no free amino compound as indicated by test.

The test for the presence of free amino compound was made by taking a small sample of the reaction mixture, cooling to 0–5° C., acidifying to Congo red with hydrochloric acid, adding a small amount of sodium nitrite, stirring a short time and destroying the excess nitrile with sulfamic acid. A spot of this solution was made on filter paper and reacted with a drop of alkaline "H" acid. The development of a red color would indicate the presence of free amine and an incomplete condensation.

When the test showed the free amine was not present, sodium carbonate was added to the reaction mixture to give a distinct alkaline reaction to phenolphthalein paper and this alkalinity was maintained for 15 minutes. The solids were filtered off, and the filter cake was washed with water and dried in an oven at 75°–80° C. The purity of the 1,3-di(4'-nitro-phenoxy-acetylamino)-benzene-4-sulfonic acid thus obtained as determined by titrating the nitro groups with titanium trichloride solution was 91.2%.

1,3-di(4'-amino-phenoxy-acetylamino)-benzene-4-sulfonic acid

To a mixture of 1000 parts of water, 250 parts of fine iron borings and 15 parts of acetic acid which was heated to 90° C., the above prepared nitro body was slowly added during a period of about three hours while good agitation and a temperature of 85°–95° C. were maintained. A test for the presence of soluble iron was made by adding to a spot of the reduction liquor on filter paper, a drop of sodium sulfide solution. A heavy black color should result.

After all of the nitro compound had been added, the mixture was agitated for 3 hours while holding the temperature of the charge at 90° C. Then the temperature was lowered to 85° C. and sodium carbonate was added until the charge was definitely alkaline to Brilliant Yellow paper. The resulting solution was clarified by adding 3 parts of a clarifying carbon, such as Darco and filtering.

The filtrate was cooled to 25°–30° C. and rendered slightly acid to Congo red papers with sulfuric acid and then cooled to 20° C. The precipitated 1,3-di(4'-amino-phenoxy-acetylamino)-benzene-4-sulfonic acid was separated by filtration and the press cake was washed with about 200 parts of water and dried in an air dryer at 50° C. The purity of the product as determined by nitrite value was 66%.

The product is represented by the formula:

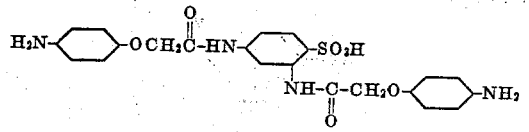

Example III
1,3-di(4'-nitro-phenoxy-acetyl-amino)-benzene

A solution was made by dissolving 130 parts of 4-nitro-phenoxy-acetyl chloride in approximately 665 parts of ethylene dichloride and warming to 70° C. The solution was cooled to 20° C. and a solution composed of 30 parts of 1,3-diamino benzene, 26 parts of sodium hydroxide and 210 parts of water was slowly added whilst maintaining a temperature of 10°–20° C. and phenolphthalein alkalinity as directed in the preceding example. The mixture was stirred 3 hours after the addition of the chloride solution.

The resulting slurry was filtered and the filter cake was washed with approximately 300 parts of water at 20° C. and then with 200 parts of water which had been distinctly acid to Congo red paper with a small amount of hydrochloric acid. The 1,3 - di(4' - nitro-phenoxy-acetylamino)-benzene thus obtained was dried in an air dryer at 65° C. The dried product was 96.8% pure and melted at 259° C.

1,3-di(4'-amino-phenoxy-acetyl-amino)-benzene

A charge composed of 150 parts of 1,3-di(4'-nitro-phenoxy-acetylamino)-benzene, 15 parts of nickel catalyst and 250 parts of ethanol in a closed autoclave, from which the air had been flushed out with hydrogen gas, was heated to 90° C. and stirred under 500 lbs./sq. in. hydrogen pressure until no more hydrogen was absorbed. The charge was held in the autoclave at 90° C. with agitation for one-half hour longer and then cooled to 25-30° C. The charge was removed from the autoclave and made acid to Congo red paper by adding hydrochloric acid. The mixture was stirred until the amine was dissolved and clarified by filtering. Ammonia was added to the filtrate until it was alkaline to phenolphthalein papers and the precipitated diamino compound was filtered off. The filter cake was washed with 200 parts of an aqueous solution containing 1% sodium carbonate and 1% sodium hydrosulfide and the product was dried in a vacuum oven at 60° C. The dried product was a light powder which melted at 151°-153° C. and had a purity of about 99% as determined by nitrite value.

The product is represented by the formula:

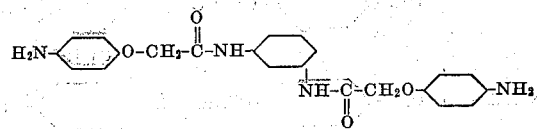

The following compounds which are represented by formulae were prepared by methods similar to those described in the foregoing examples. The purity of the nitro compounds was determined by TiCl₃ value and the purity of the amino compounds was determined by nitrite value.

| Example | Formula | Melting point | Purity |
|---|---|---|---|
| | | °C. | Per cent |
| IV | O₂N—⟨⟩—OCH₂C(O)—HN—⟨⟩(OCH₃)(NO₂) | 223-224 | 97.4 |
| | H₂N—⟨⟩—OCH₂C(O)—HN—⟨⟩(OCH₃)(NH₂) | 97-100 | 74.3 |
| V | O₂N—⟨⟩—O—CH₂C(O)—HN—⟨⟩(OCH₃)(NO₂)(OCH₃) | 216-217 | 60.7 |
| | H₂N—⟨⟩—OCH₂C(O)—HN—⟨⟩(OCH₃)(NH₂)(OCH₃) | 102 | |
| VI | O₂N—⟨⟩(OCH₃)—OCH₂C(O)—HN—⟨⟩—NO₂ | 179 | 97.0 |
| | H₂N—⟨⟩(OCH₃)—OCH₂C(O)—HN—⟨⟩—NH₂ | 93 | 79.6 |
| VII | O₂N—⟨⟩(OCH₃)—OCH₂C(O)—HN—⟨⟩(NO₂) | 207 | 96.4 |
| | H₂N—⟨⟩(OCH₃)—OCH₂C(O)—HN—⟨⟩(NH₂) | | |
| VIII | O₂N—⟨⟩—OCH₂C(O)—HN—⟨⟩(CH₃)(NO₂) | 214 | 99.3 |
| | H₂N—⟨⟩—OCH₂C(O)—HN—⟨⟩(CH₃)(NH₂) | 135 | 100 |

| Example | Formula | Melting point (°C.) | Purity (Per cent) |
|---|---|---|---|
| IX | O$_2$N—⟨⟩—OCH$_2$C(O)—HN—⟨COOH, NO$_2$⟩ | | 84.9 |
| | H$_2$N—⟨⟩—OCH$_2$C(O)—HN—⟨COOH, NH$_2$⟩ | | 78.4 |
| X | O$_2$N—⟨⟩—OCH$_2$C(O)—HN—⟨OCH$_3$, NO$_2$⟩ | 210 | 98.8 |
| | H$_2$N—⟨⟩—OCH$_2$C(O)—HN—⟨OCH$_3$, NH$_2$⟩ | 95 | 90.0 |
| XI | O$_2$N—⟨⟩—OCH$_2$C(O)—HN—⟨Cl, NO$_2$⟩ | 200–202 | 97.8 |
| | H$_2$N—⟨⟩—OCH$_2$C(O)—HN—⟨Cl, NH$_2$⟩ | 133 | |
| XII | O$_2$N—⟨⟩—OCH$_2$C(O)—HN—⟨SO$_3$H, SO$_3$H⟩—⟨⟩—NH—C(O)—CH$_2$O—⟨⟩—NO$_2$ | | 87.3 |
| | H$_2$N—⟨⟩—OCH$_2$C(O)—HN—⟨SO$_3$H, SO$_3$H⟩—⟨⟩—NH—C(O)—CH$_2$O—⟨⟩—NH$_2$ | | |
| XIII | O$_2$N—⟨⟩—OCH$_2$C(O)—HN—(naphthyl)—NO$_2$ | 168 | 92.4 |
| | H$_2$N—⟨⟩—OCH$_2$C(O)—HN—(naphthyl)—NH$_2$ | 167 | 89.4 |
| XIV | O$_2$N—⟨⟩—OCH$_2$C(O)—HN—⟨SO$_3$H⟩—NH—C(O)—CH$_2$O—⟨⟩—NO$_2$ | | |
| | H$_2$N—⟨⟩—OCH$_2$C(O)—HN—⟨SO$_3$H⟩—NH—C(O)—CH$_2$O—⟨⟩—NH$_2$ | | |
| XV | O$_2$N—⟨⟩—OCH$_2$C(O)—HN—(naphthyl, SO$_3$H)—NH—C(O)—CH$_2$O—⟨⟩—NO$_2$ | | |
| | H$_2$N—⟨⟩—OCH$_2$C(O)—HN—(naphthyl, SO$_3$H)—NH—C(O)—CH$_2$O—⟨⟩—NH$_2$ | | |
| XVI | O$_2$N—⟨⟩—OCH$_2$C(O)—HN—⟨⟩—NO$_2$ | | 97.4 |
| | H$_2$N—⟨⟩—OCH$_2$C(O)—HN—⟨⟩—NO$_2$ | 105–108 | 95.9 |

| Example | Formula | Melting point | Purity |
|---|---|---|---|
| | | °C. | Per cent |
| XVII | O₂N—⟨⟩—OCH₂C(O)—HN—⟨⟩(CH₃)—NO₂ | 175 | 98.7 |
| | H₂N—⟨⟩—OCH₂C(O)—HN—⟨⟩(CH₃)—NH₂ | 90 | 91.7 |
| XVIII | ⟨⟩(NO₂)—OCH₂C(O)—HN—⟨⟩—NO₂ | 231 | 90.0 |
| | ⟨⟩(NH₂)—OCH₂C(O)—HN—⟨⟩—NH₂ | 130–132 | |

As illustrations of other nitro acid halides which can be used in making other compounds of the invention instead of those enumerated in the foregoing examples are mentioned 4-methyl-2-nitro-phenoxy-acetyl chloride, beta(4-nitrophenoxy)-propionyl chloride, alpha(4-nitrophenoxy)-propionyl chloride, alpha(3-nitro-phenoxy)-n-butyryl bromide, 2,4-dimethyl-5-nitrophenoxy-acetyl chloride, 2,4-dichloro-5-nitrophenoxy-acetyl chloride, alpha(4-nitro-phenoxy)-n-heptoyl chloride, beta(4-nitro-phenoxy)-n-butyryl chloride, alpha(3-nitro-phenoxy)-alpha-methyl-butyryl chloride, 2-ethyl-4-nitro-phenoxy-acetal chloride, and alpha(2-isopropyl-4-nitro-phenoxy)-butyryl chloride.

As illustrative of the class of diamino- and nitro-amino-aryl compounds of the benzene, naphthalene and biphenyl series which can be used to make other compounds of the invention instead of those enumerated in the foregoing examples are 4-nitro-2-ethoxy aniline, 4-nitro-2-ethyl aniline, 4-nitro-2-methyl-5-methoxy-aniline, 1,4-diamino-2-methyl-5-methoxy-benzene, 2,5-diamino-benzoic acid, 1,4-diamino-2,5-dimethoxy-benzene, 3,3'-dicarboxy-benzidine, benzidine-diglycolic acid, 1,3-diamino-4-chlorobenzene, dianisidine, benzidine, tolidine, 3,3'-dimethyl-2,2'-dichloro-benzidine, 2,2',5,5'-tetramethoxy-benzidine, 3,3'-dimethoxy-6,6'-dichloro-benzidine, 1,4-diamino-naphthalene-6-carboxylic acid, 1-amino-4-nitro-naphthalene-6-sulfonic acid, 1-amino-4-nitro-naphthalene-7-sulfonic acid, 1,4-diamino-naphthalene-6-sulfonic acid, 2-amino-5-nitro-phenoxy-acetic acid, 2,5-diamino-phenoxy-acetic acid, 2-amino-4-nitro-phenoxy-acetic acid, 4-nitro-2-ethyl-aniline, 1,4-diamino-2-isopropyl-benzene and 4-nitro-2-isoamyl aniline.

The new compounds can be used for various purposes. Besides being useful as intermediates from which other compounds can be made, many of the amino derivatives can be used as azo dye coupling components. The amino derivatives are also valuable as tetrazo bases for the preparation of azo dyes. Various dyes made with such tetrazo bases have been found to have surprisingly bright shades and other desirable properties desired in azo dyes.

As indicated in the foregoing examples, toluene is a suitable inert organic solvent in the condensation but other inert organic solvents can be used, such as ethylene-dichloride, ortho-dichlorobenzene, chloroform, carbon tetrachloride and benzene, due regard being had to the known limitations of such inert solvents. By inert organic solvent is meant an organic solvent which will form a solution with the material to be reacted and which will not be acted upon so as to impair the condensation or reduction product to be manufactured. In the catalytic reduction, methanol is indicated as a suitable inert organic solvent but others can be used, such as hexane, benzene, ethanol, dioxan and ethylene glycol. Any of the nickel hydrogenation catalysts, such as reduced nickel on an inert support or "Raney" nickel catalyst are suitable.

Still other modifications in the reduction of the nitro groups can be made such as the reduction of the nitro groups by the action of various alkali metal sulfides in ammoniacal reducing media. Thus many modifications can be made in the methods of producing the described compounds with respect to the temperature and proportions of the reaction media, the inert solvent, the addition rates, the reducing agent, pressures and the like, without departing from the invention.

From the foregoing disclosure it will be recognized that the invention is susceptible of modification without departing from the spirit and scope thereof and it is to be understood that the invention is not restricted to the specific illustrations thereof herein set forth.

I claim:

The compound represented by the formula

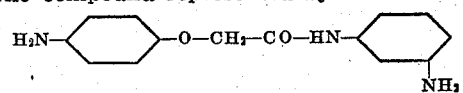

CHILES E. SPARKS.

Certificate of Correction

Patent No. 2,361,327. October 24, 1944.

CHILES E. SPARKS

It is hereby certified that errors appear in the printed specification of the above numbered patent requiring correction as follows: Page 2, second column, line 1, for "nitrile" read *nitrite*; page 3, second column, line 12, for that portion of the formula reading page 4, Example XII, for that portion of the formula reading

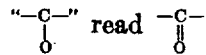

and that the said Letters Patent should be read with these corrections therein that the same may conform to the record of the case in the Patent Office.

Signed and sealed this 23rd day of January, A. D. 1945.

[SEAL]

LESLIE FRAZER,
*Acting Commissioner of Patents.*